S. T. SAVAGE.
Cooking Stove.
No. 2,425. Reissued Dec. 18, 1866.
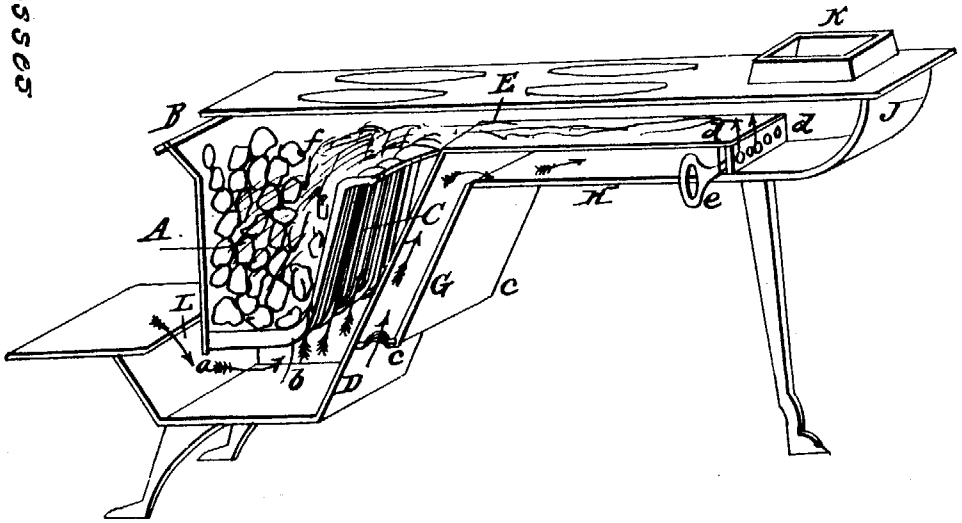
Witnesses
Inventor
S T Savage
N. PETERS, Photo-Lithographer, Washington, D. C.

United States Patent Office.

HEATING STOVE.

SILAS T. SAVAGE, OF ALBANY, NEW YORK.

*Letters Patent No.* 19,796, *dated March* 30, 1858; *reissue No.* 2,425, *dated December* 18, 1866.

The Schedule referred to in these Letters Patent and making part of the same.

TO ALL WHOM IT MAY CONCERN:

Be it known that I, SILAS T. SAVAGE, of the city and county of Albany, and State of New York, have invented a new and useful Improvement in the Construction of Stoves; and I declare the following specification, with the drawings hereto annexed as part thereof, to be a full and clear description of the same.

The object of my invention is to accomplish in stoves the following results: first, the regulation and control of the quantity of fuel to be kept in ignition at any one time; second, the preparation or coking of the fuel preparatory to c[illegible]ation; third, the combustion, as far as may be, of the unconsumed gases and fuliginous matters that p[illegible] from the fire-chamber into the flues. The figure in the drawing represents the body of a cooking stove of [illegible]orm well known, with the right-hand side plates removed to show its interior arrangements. The fire-chamber, A, has close sides, with a feeding door at B. The grate, C, is placed in the reverse of the usual position, that is, with the open bars in the rear, leaving an air space between them and the back plate, D, of the fire-chamber, the coal lying between the grates and the front plate of the stove. The bottom of the grates may be solid for some inches, say from *a* to *b*, the amount of solid space, if any, being regulated by the proportion of the mass of coal in the grate that it is wished to keep ignited at one time. The upper ends of the grate bars, after curving or sloping upward and backward, may, at their tops, be bent short backward for say an inch or two, and then terminated against the bottom plate E of the flue. The smoke-exit flue is at K, and in the drawing is meant to represent the flange for the adaptation of an elevated oven, for which kind of cooking stoves this arrangement is very advantageously adapted. Operation: The fire-box being filled with coal and ignited, the draught of air is supplied through the hearth register at L, when (as shown by the feathered arrows) the air passes under the grate, and up into the air-channel between the grates and the back plate, thence through the grate bars, creating an upright draught through the coal, operating in the line *b f*, and producing an active combustion of the fuel lying between it and the grate bars. Although the ignition of the coal will extend, as experience has fully shown, but little, if any, back of *b f*, yet the heat of the burning coal will distill out, from the mass of coal lying back of that line, for a couple of inches or more, the bituminous matter and gas, coking and preparing it for burning, when it is pressed forward next the grate bars. This process burns up most of the fuliginous matter and gases in the fuel; nevertheless portions will escape, highly heated but not inflamed. As these pass over the upper ends of the bars they encounter some of the air which may not have been drawn within the grates from the air-chamber, producing a further combustion of these matters, and almost wholly freein gthe flue of them. Although this, my invention, is peculiarly adapted and intended for the burning of bituminous coal, yet it is to be used for the consumption of any sort of fuel that can be used advantageously with the stove. It is also intended to be employed with any fuel-consuming apparatus, such as boilers of steamboats, or any analogous matters.

I am aware that stoves have been constructed with grates open all around, or basket-wise, so as to use the radiant heat from the back of the fire for roasting, or other cooking, but that arrangement does not effect either one of the objects of my invention as above stated, and I therefore disclaim any such construction or arrangement of grate and stove; but—

I claim, in stoves or furnaces, a fire-box with a grated back for the admission of the air, which circulates through the ash-pit and the flue back of the grate, substantially as described.

To the above specification of my improvement in stoves I have signed my hand this 27th of October, 1866.

S. T. SAVAGE.

Witnesses:

EDWARD H. KNIGHT,

J. W. PAIRGS.